US009164238B2

(12) United States Patent
Park et al.

(10) Patent No.: US 9,164,238 B2
(45) Date of Patent: Oct. 20, 2015

(54) OPTICAL COUPLER HAVING SELF-FOCUSING REGION AND ARRYED-WAVEGUIDE GRATING STRUCTURE INCLUDING THE SAME

(71) Applicant: Electronics and Telecommunications Research Institute, Daejeon (KR)

(72) Inventors: Jaegyu Park, Daejeon (KR); Hyundai Park, Daejeon (KR); Jiho Joo, Daejeon (KR); Myung joon Kwack, Gimpo-si (KR); Gyungock Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/329,878

(22) Filed: Jul. 11, 2014

(65) Prior Publication Data

US 2015/0078708 A1    Mar. 19, 2015

(30) Foreign Application Priority Data

Sep. 16, 2013   (KR) .................. 10-2013-0111269
Jan. 9, 2014    (KR) .................. 10-2014-0002919

(51) Int. Cl.
*G02B 6/34* (2006.01)
*G02B 6/26* (2006.01)

(52) U.S. Cl.
CPC .  *G02B 6/262* (2013.01); *G02B 6/34* (2013.01)

(58) Field of Classification Search
CPC ............. G02B 6/1228; G02B 6/29326; G02B 5/1819; G02B 2006/12097; G02B 2006/12164; G02B 6/29325; H01S 5/1014; H01S 5/4025

USPC .................. 385/14, 15, 31, 37, 129, 24, 28
See application file for complete search history.

(56) References Cited

U.S. PATENT DOCUMENTS

| | | | | |
|---|---|---|---|---|
| 5,706,377 A * | 1/1998 | Li | ................................... | 385/37 |
| 5,889,906 A * | 3/1999 | Chen | .............................. | 385/28 |
| 6,069,990 A * | 5/2000 | Okawa et al. | .................. | 385/43 |
| 6,563,988 B2 * | 5/2003 | McGreer | ......................... | 385/43 |
| 6,898,349 B2 * | 5/2005 | Yamauchi et al. | ............. | 385/37 |
| 7,020,358 B2 * | 3/2006 | Tabuchi et al. | ................. | 385/24 |
| 7,174,071 B2 * | 2/2007 | Van Weerden et al. | ......... | 385/37 |
| 7,668,416 B2 * | 2/2010 | Li | ................................... | 385/14 |
| 7,831,122 B2 * | 11/2010 | Kondou et al. | ............... | 385/129 |
| 2002/0017260 A1 | 2/2002 | Saito et al. | | |
| 2002/0172460 A1 | 11/2002 | Tyan et al. | | |
| 2003/0081898 A1 * | 5/2003 | Tabuchi et al. | .................. | 385/37 |
| 2003/0228104 A1 * | 12/2003 | Tabuchi | .......................... | 385/37 |
| 2004/0120674 A1 | 6/2004 | So et al. | | |
| 2005/0135748 A1 * | 6/2005 | Yamazaki | ....................... | 385/37 |

(Continued)

OTHER PUBLICATIONS

Wim Bogaerts et al., "A polarization-diversity wavelength duplexer circuit in silicon-on-insulator photonic wires", Optics Express, Feb. 19, 2007, vol. 15, No. 4.

*Primary Examiner* — Ellen Kim

(57) ABSTRACT

Provided are an optical coupler and an arrayed-waveguide grating structure including the same. The coupler includes a lower clad layer, a core comprising a slab waveguide region disposed on one side of the lower clad layer and a ridge waveguide region disposed on the other side of the lower clad layer, and an upper clad disposed on the core, wherein the ridge waveguide region comprises a self-focusing region configured to focus an optical signal provided form the slab waveguide region and thus to prevent scattering of the optical signal.

19 Claims, 24 Drawing Sheets

(56) References Cited

U.S. PATENT DOCUMENTS

| | | | |
|---|---|---|---|
| 2007/0086703 A1 * | 4/2007 | Kirk et al. .................. 385/37 |
| 2008/0292239 A1 | 11/2008 | Fondeur et al. |
| 2009/0252457 A1 | 10/2009 | Kim et al. |

* cited by examiner

OPTICAL COUPLER HAVING SELF-FOCUSING REGION AND ARRYED-WAVEGUIDE GRATING STRUCTURE INCLUDING THE SAME

CROSS-REFERENCE TO RELATED APPLICATIONS

This U.S. non-provisional patent application claims priority under 35 U.S.C. §119 of Korean Patent Application Nos. 10-2013-0111269, filed on Sep. 16, 2013, and 10-2014-0002919, filed on Jan. 9, 2014, the entire contents of which are hereby incorporated by reference.

BACKGROUND OF THE INVENTION

The present invention disclosed herein relates to an optical coupler and an arrayed-waveguide grating structure including the same, and more particularly, to an optical coupler having a self-focusing region and an arrayed-waveguide grating structure including the same.

An optical element for muxing/dumuxing of a signal in optical communication fields and photonic integrated circuit (PIC) fields may include a arrayed-waveguide grating (AWG), an Echelle grating, a ring filter or a Mach-2ehnder interferometer. Among them, the AWG is a wavelength division multiplexer (WDM) device which is the most widely used. As the AWG, a silica-based AWG and a silicon or InP-based AWG has been studied. Here, the silicon and the InP have a larger refractive index than that of the silica.

If a material having a large refractive index is used, a curvature radius thereof becomes smaller, and an optical loss is minimized, and thus a size of the AWG device may be reduced. A general insertion loss of the AWG may be about 3 dB, and thus, how to reduce the insertion loss of the AWG is very important task. The insertion loss of the AWG is caused by a slab waveguide, couple structures between the arrayed-waveguides, and a waveguide loss.

SUMMARY OF THE INVENTION

The present invention provides an optical coupler which may minimize an optical coupling loss, and an arrayed-waveguide grating structure including the same.

Embodiments of the inventive concept provide couplers including a lower clad layer, a core including a slab waveguide region disposed on one side of the lower clad layer and a ridge waveguide region disposed on the other side of the lower clad layer, and an upper clad disposed on the core, wherein the ridge waveguide region includes a self-focusing region configured to focus an optical signal provided form the slab waveguide region to prevent scattering of the optical signal.

In some embodiments, the ridge waveguide region may further include a tapering region between the slab waveguide region and the self-focusing region, and a straight region between the tapering region and the self-focusing region.

In other embodiments, the core may include a slab disposed at the slab waveguide region and the ridge waveguide region, and a plurality of ribs extend in a first direction on the slab of the ridge waveguide region.

In still other embodiments, the ribs may include upper ribs disposed on the slab to extend from the tapering region to the self-focusing region, and lower ribs disposed between the upper ribs and the slab to be disposed in the self-focusing region.

In even other embodiments, the lower ribs may be defined by trenches on the slab in the self-focusing region.

In yet other embodiments, a line width of each of the lower ribs may be wider than that of each of the upper ribs.

In further embodiments, the self-focusing region may become far from the slab while a thickness of each of the upper ribs becomes thinner, and thus an optical condition may exist in a distance between the slab and the trench.

In still further embodiments, a width of the upper rib may be limited to allow only a zero-order mode and a primary mode at a boundary of the slab and the upper rib, and thus generation of a multi-mode at the self-focusing region including the upper rib may be limited, when light proceeds through the arrayed waveguides of the slab.

In even further embodiments, as a thickness of the upper rib becomes thinner, a loss due to scattering at the boundary of the slab and the upper rib may be reduced, and if the thickness of the upper rib is too thin, the self-focusing region may not be generated and thus a loss due to the scattering may be increased. Therefore, the thickness of the upper rib may be optimally selected to minimize the scattering of the signal and also to properly generate the self-focusing region.

In yet further embodiments, the lower ribs may be shorter than the upper ribs.

In much further embodiments, the upper ribs may be inverse-tapered so that each line width thereof is gradually increased from the slab waveguide region toward the straight region.

In still much further embodiments, the slab may have the same height at the slab waveguide region, the tapering region and the straight region. The lower ribs may have the same height as that of the slab in the straight region, the tapering region and the slab waveguide region.

In even much further embodiments, the upper ribs may have a refractive index lower than that of the lower ribs and larger than the clad.

In yet much further embodiments, the lower ribs may include crystalline silicon, and the upper ribs may include a silicon nitride film or a silicon oxynitride film.

In yet still much further embodiments, the upper ribs may be forward-tapered so that each line width thereof is gradually reduced from the slab waveguide region toward the straight region.

In yet still much further embodiments, the slab may have different heights at the slab waveguide region and the ridge waveguide region.

In yet still much further embodiments, the slab of the slab waveguide region and the upper ribs of the ridge waveguide region may have the same height.

In yet still much further embodiments, the slab may include a lower slab disposed at the slab waveguide region and the ridge waveguide region, and an upper slab disposed on the lower slab of the slab waveguide region, the upper slab have a refractive index higher than that of the lower slab.

In yet still much further embodiments, the lower slab and the lower ribs may include crystalline silicon. The upper slab and the upper ribs may include a silicon nitride film or a silicon oxynitride film.

In other embodiments of the inventive concept, arrayed-waveguide grating structure including an input star coupler, an output star coupler disposed to be adjacent to the input star coupler, and an arrayed waveguide structure having a plurality of arrayed waveguides configured to be connected to the output star coupler and the input star coupler, wherein the output star coupler includes a lower clad layer, a core including a slab waveguide region disposed on one side of the lower clad layer and a ridge waveguide region disposed on the other side of the lower clad layer, and an upper clad disposed on the core, and wherein the ridge waveguide region includes a self-focusing region configured to focus an optical signal provided form the slab waveguide region and thus to prevent scattering of the optical signal.

In some embodiments, the arrayed waveguides may include arrayed slabs and arrayed ridge waveguides disposed on the arrayed slabs.

In other embodiments, the core of the self-focusing region may include a coupler slab configured to be connected to the arrayed slabs, and coupler ribs disposed on the coupler slab to be connected to the arrayed ridge waveguides, and the coupler ribs may include upper coupler ribs and lower coupler ribs between the upper coupler ribs and the coupler slab.

In still other embodiments, the arrayed ridge waveguide may include lower arrayed ridge waveguides disposed on the arrayed slabs to be connected to the lower coupler ribs, and upper arrayed ridge waveguides disposed on the lower arrayed ridge waveguides to be connected to the upper coupler ribs.

BRIEF DESCRIPTION OF THE DRAWINGS

The accompanying drawings are included to provide a further understanding of the present invention, and are incorporated in and constitute a part of this specification. The drawings illustrate exemplary embodiments of the inventive concept and, together with the description, serve to explain principles of the present invention. In the drawings.

DETAILED DESCRIPTION OF PREFERRED EMBODIMENTS

Figure 1:
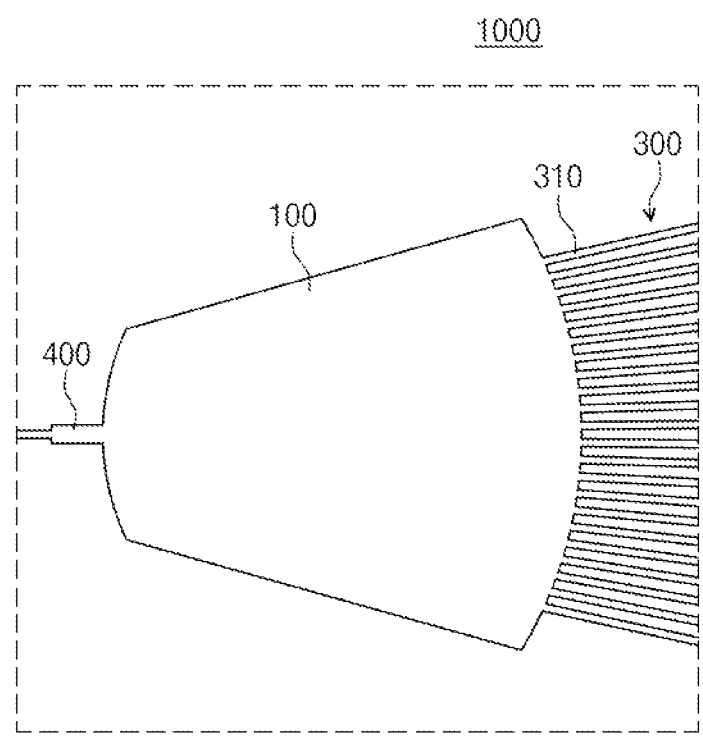
FIG. 1 is a plan view illustrating an input star coupler and an arrayed-waveguide structure of a general arrayed-waveguide grating.

Preferred embodiments of the inventive concept will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. The same reference numerals are given to the same or corresponding parts, and the description thereof will not be repeated.

The terms used herein are merely to describe a specific embodiment, and thus the present invention is not limited to them. Further, as far as singular expression clearly denotes a different meaning in context, it includes plural expression.

It is understood that terms "comprises", "comprising", "includes" or "has" intend to indicate the existence of features, numerals, steps, operations, elements and components described in the specification or the existence of the combination of these, and do not exclude the existence of one or more other features, numerals, steps, operations, elements and components or the existence of the combination of these or additional possibility beforehand.

Hereinafter, it will be described about an exemplary embodiment of the inventive concept in conjunction with the accompanying drawings.

Figure 2:
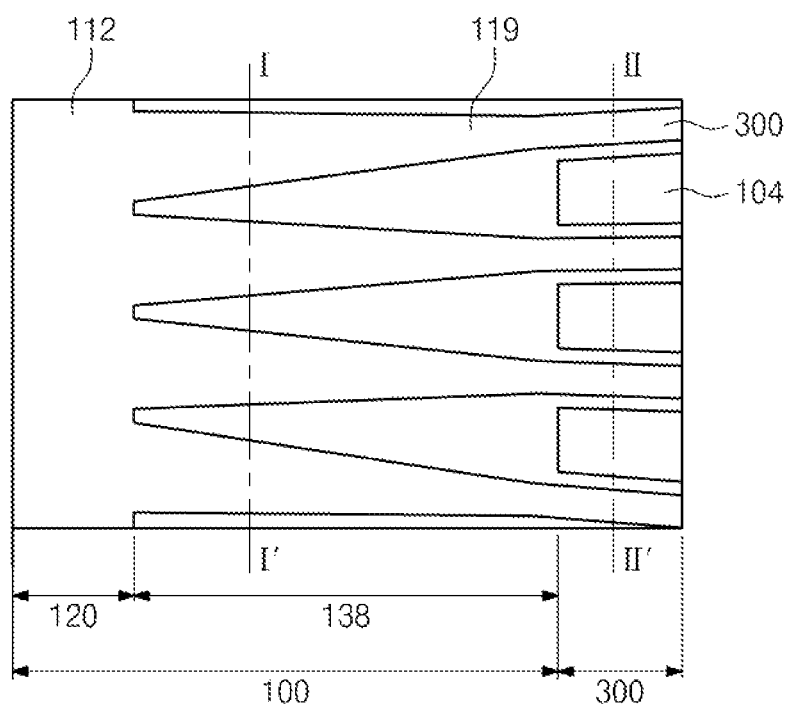
FIG. 2 is a plan view enlargedly illustrating the input star coupler and arrayed-waveguides of FIG. 1.
Figure 3:
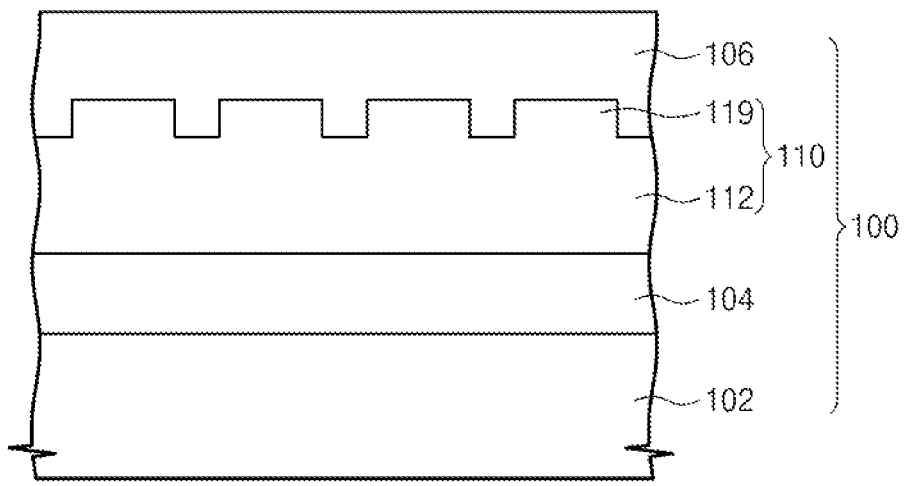
FIG. 3 is a cross-sectional view taken along a line i-r of FIG. 2.
Figure 4:
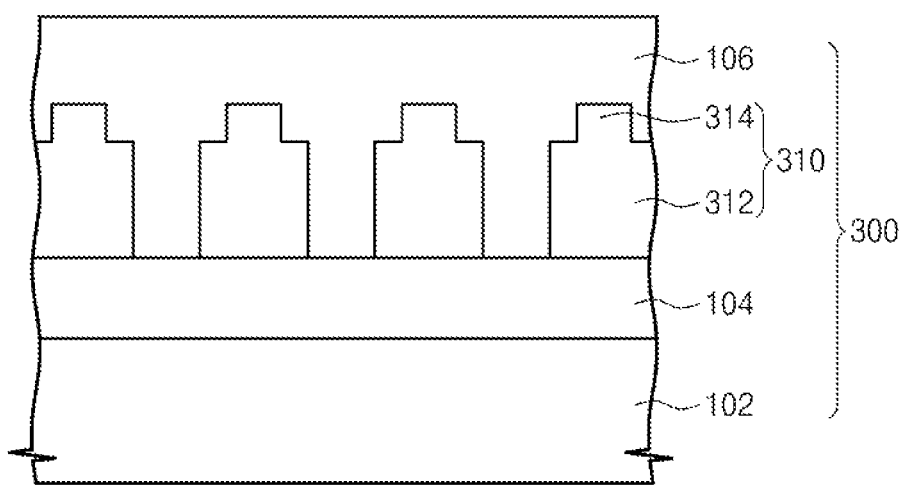
FIG. 4 is a cross-sectional view taken along a line II-II'.

FIG. 1 is a plan view illustrating an input star coupler 100 and an arrayed-waveguide structure 300 of a general arrayed-waveguide grating 1000. FIG. 2 is a plan view enlargedly illustrating the input star coupler 100 and arrayed-waveguides 310 of FIG. 1. FIG. 3 is a cross-sectional view taken along a line i-r of FIG. 2. FIG. 4 is a cross-sectional view taken along a line II-II'.

Referring to FIGS. 1 to 4, a general arrayed-waveguide grating 1000 may include an input star coupler 100 and an arrayed-waveguide structure 300.

The input star coupler 100 may be disposed between an input waveguide 400 and arrayed-waveguides 310. An arrayed-waveguide structure 300 may include the plurality of arrayed-waveguides 310. The input waveguide 400 may provide light to the input star coupler 100. The input star coupler 100 distributes light to each of the arrayed-waveguides 310. The input star coupler 100 may include a substrate 102, a lower clad 104, a coupler core 110 and an upper clad 106.

The coupler core 110 may include a coupler slab 112 and forward coupler ribs 119. The forward coupler ribs 119 may be tapered forwardly with respect to a direction of the arrayed-waveguides 310 at the coupler slab 112.

The coupler core 110 may include a coupler slab waveguide region 120 and a forward ridge waveguide region 138. The coupler core 110 of the coupler slab waveguide region 120 may include the coupler slab 112. An optical signal may be radially spread in the coupler slab 112 of the coupler slab waveguide region 120.

The coupler core 110 of the forward ridge waveguide region 138 may include the coupler slab 112 and the forward coupler ribs 119 on the coupler slab 112. The light signal may be provided to the forward coupler ribs 119 of the forward ridge waveguide region 138 and the coupler slab 112 under the forward coupler ribs 119. The optical signal in the forward coupler ribs 119 of the forward ridge waveguide region 138 and the coupler slab 112 may be a single mode.

The general arrayed-waveguide grating 1000 may have optical coupling loss. The optical coupling loss may mainly occur between the coupler slab waveguide region 120 and the arrayed-waveguides 310. The arrayed-waveguides 310 may be connected to the input star coupler 100.

The arrayed-waveguides 310 may include arrayed slabs 312 and arrayed ribs 314. The arrayed slabs 312 may be connected to the coupler slab 112. The arrayed ribs 314 may be respectively connected to coupler ribs 114. The arrayed slabs 312 may be separated from each other. A gap between the arrayed slabs 312 has a limited value due to limitation in a manufacturing process. Therefore, scattering of light may occur at the gap between the arrayed slabs 312. Further, a multi-mode may be generated by mode field mismatching between the coupler slab 112 and the forward coupler ribs 119. While proceeding through a single mode waveguide, higher order modes are scattered and acts as the loss. Therefore, the general arrayed-waveguide grating 1000 may have increased optical coupling loss.

Figure 5:
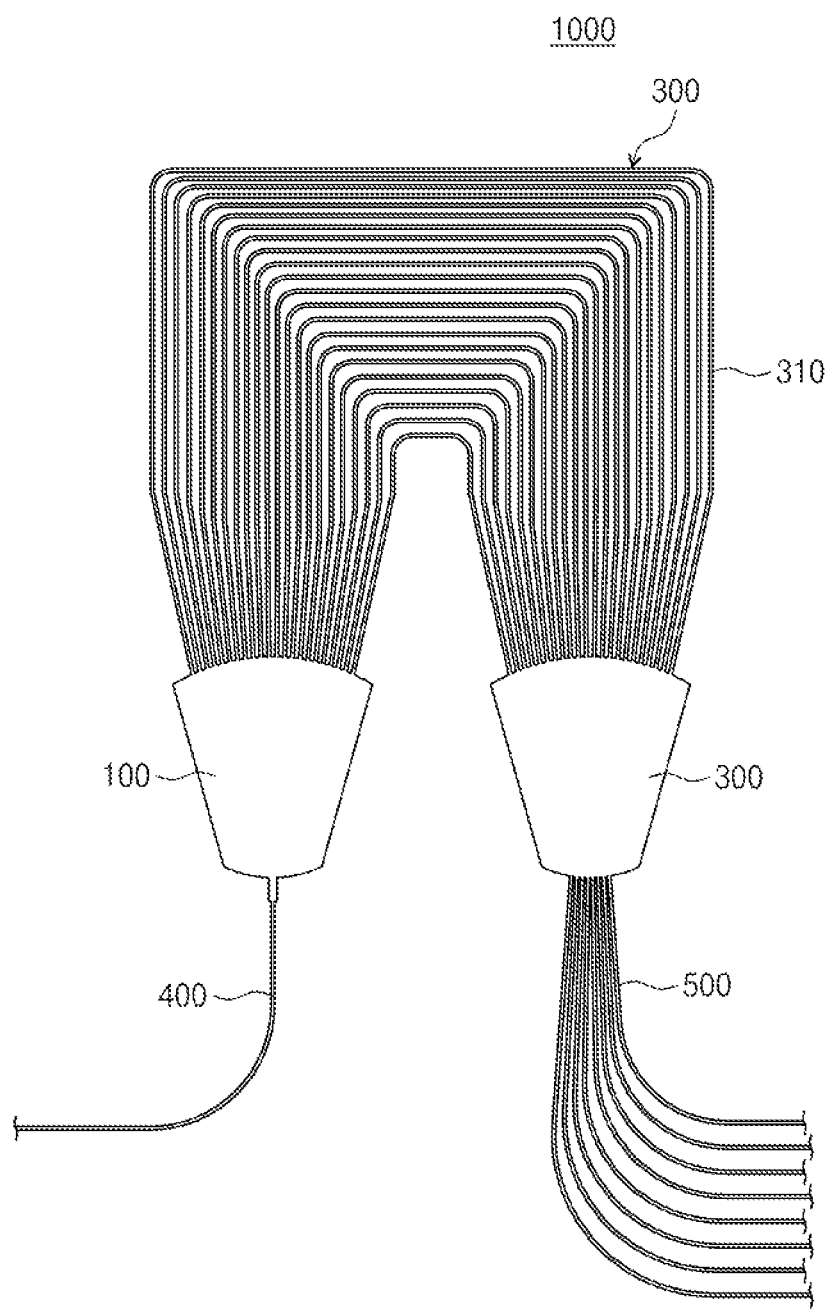
FIG. 5 is a plan view illustrating an arrayed-waveguide grating according to a first embodiment of the inventive concept.
Figure 6:
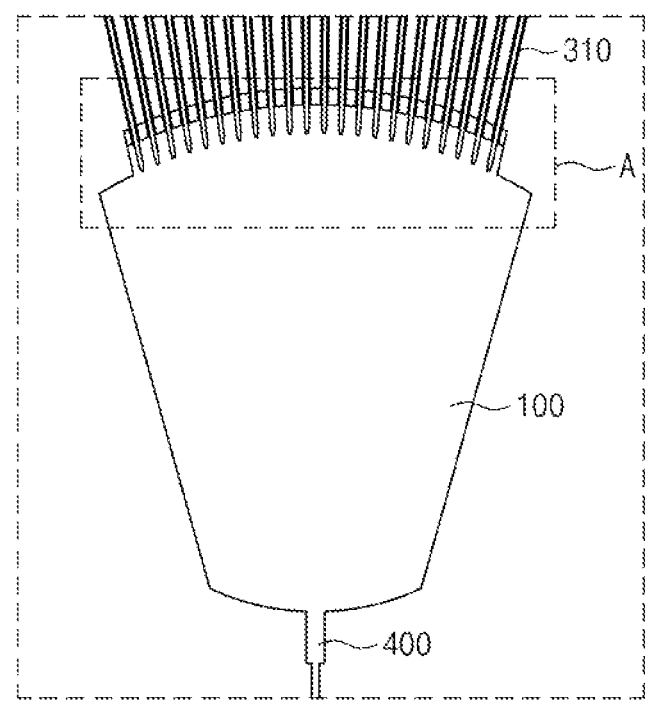
FIG. 6 is a plan view illustrating an input star coupler and arrayed-waveguides.
Figure 7A:
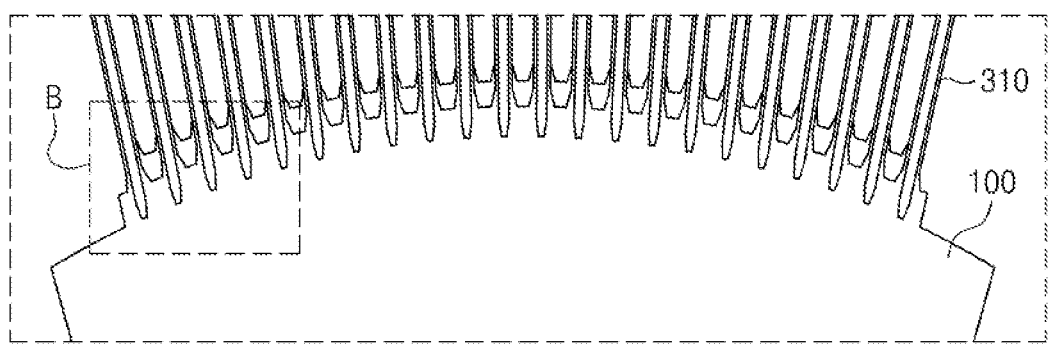
FIGS. 7A and 7B are plan views enlargedly illustrating a part A of FIG. 6.
Figure 7B:
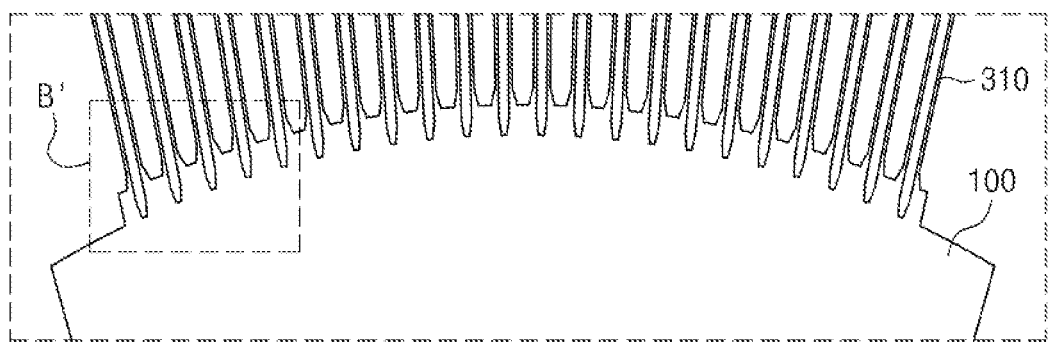
Figure 8A:
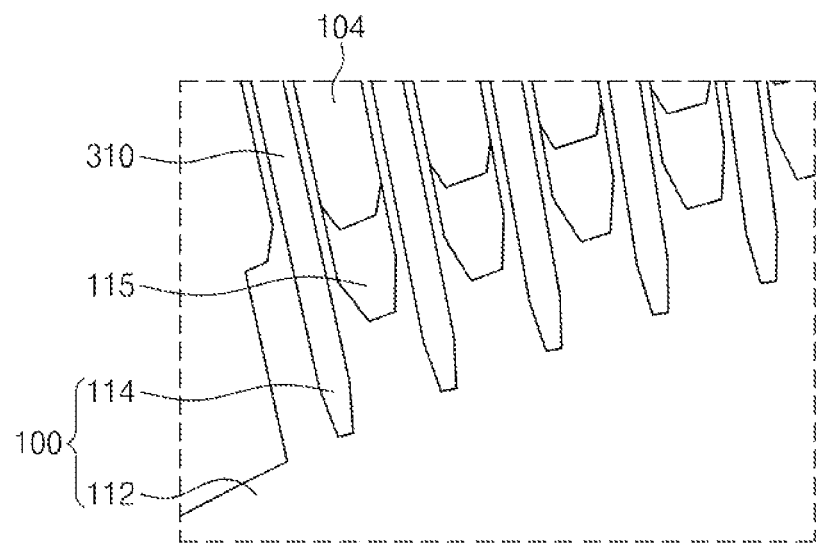
FIGS. 8A and 8B are plan views enlargedly illustrating a part B and a part B' of FIGS. 7A and 7B.
Figure 8B:
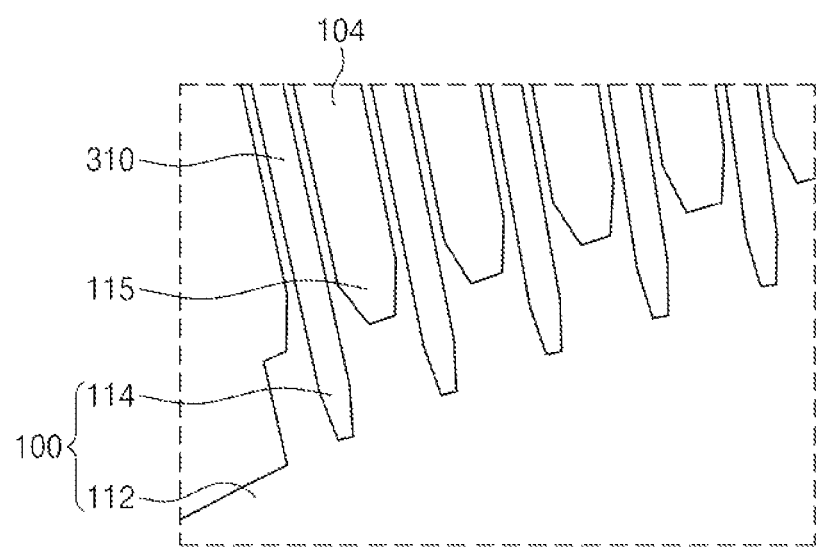

FIG. 5 is a plan view illustrating an arrayed-waveguide grating 1000 according to a first embodiment of the inventive concept. FIG. 6 is a plan view illustrating an input star coupler 100 and arrayed-waveguides 310. FIGS. 7A and 7B are plan views enlargedly illustrating a part A of FIG. 6. FIGS. 8A and 8B are plan views enlargedly illustrating a part B and a part B' of FIGS. 7A and 7B.

Referring to FIGS. 5 to 8B, the arrayed-waveguide grating 1000 of first embodiment of the inventive concept may include an input star coupler 100, an arrayed waveguide structure 300, and an output star coupler 200.

The input star coupler 100 and the output star coupler 200 may be disposed to be adjacent to each other. The input star coupler 100 and the output star coupler 200 may be disposed in the same direction.

In the arrayed waveguide structure 300, arrayed waveguides 310 may be provided to have different length from each other. The arrayed waveguides 310 may be connected between the input star coupler 100 and the output star coupler 200. The arrayed waveguides 310 may be connected in the same direction with respect to each of the input star coupler 100 and the output star coupler 200. The arrayed waveguides 310 may be bent. For example, the arrayed waveguides 310 may be bent in a c shape. A length difference may occur between the arrayed waveguides 310. The arrayed waveguide structure 300 may serve as a diffraction grid. Therefore, the optical signal output from the arrayed waveguides 310 may be focused on different positions according to a wavelength of the optical signal.

Output waveguides 500 may be connected to the other side of the output star coupler 200 which is opposite to the arrayed waveguides 310. The output star coupler 200 may separate (i.e., demultiplex) the optical signal by the wavelength thereof and then output the optical signal to the output waveguides 500. On the other hand, when the optical signals having various wavelengths are incident to the output waveguides 500, multiplexed optical signals are output from an input waveguide 400. That is, the arrayed-waveguide grating 1000 may be used for multiplexing and demultiplexing.

Meanwhile, the coupler core 110 of the input star coupler 100 may be connected to the arrayed waveguides 310.

The coupler core 110 may include the coupler slab 112 and the coupler ribs 114 on one side of the coupler slab 112. The coupler ribs 114 may be inverse-tapered at the coupler slab 112 so that a line width is increased in a direction of the arrayed waveguides 310. The coupler slab 112 may have a trench 115 between the coupler ribs 114. The trench 115 may taper the coupler slab 112 in the direction of the arrayed waveguides 310. The trench 115 may induce self-focusing of the input star coupler 100 with respect to the optical signal.

Figure 9A:
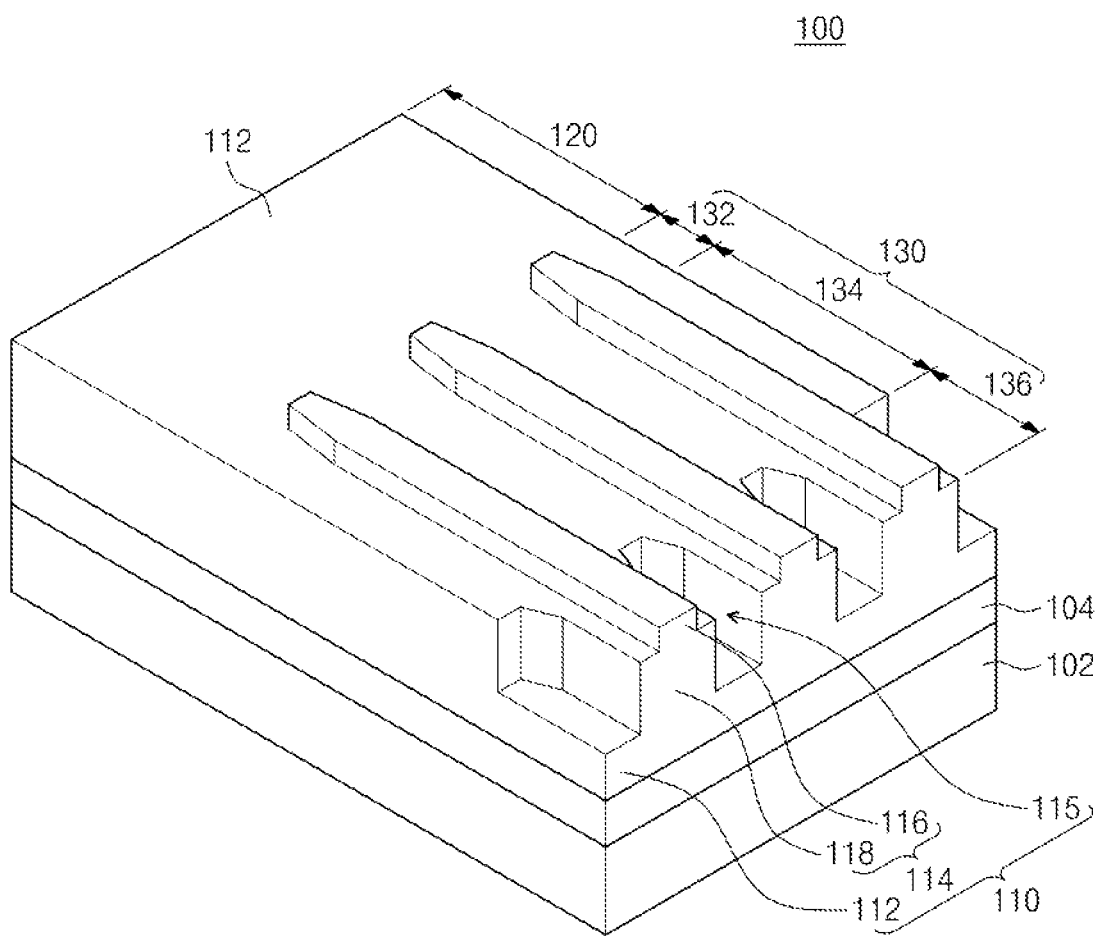
FIGS. 9A and 9B are perspective views further enlargedly illustrating the part B and the part B' of FIGS. 7A and 7B.
Figure 9B:
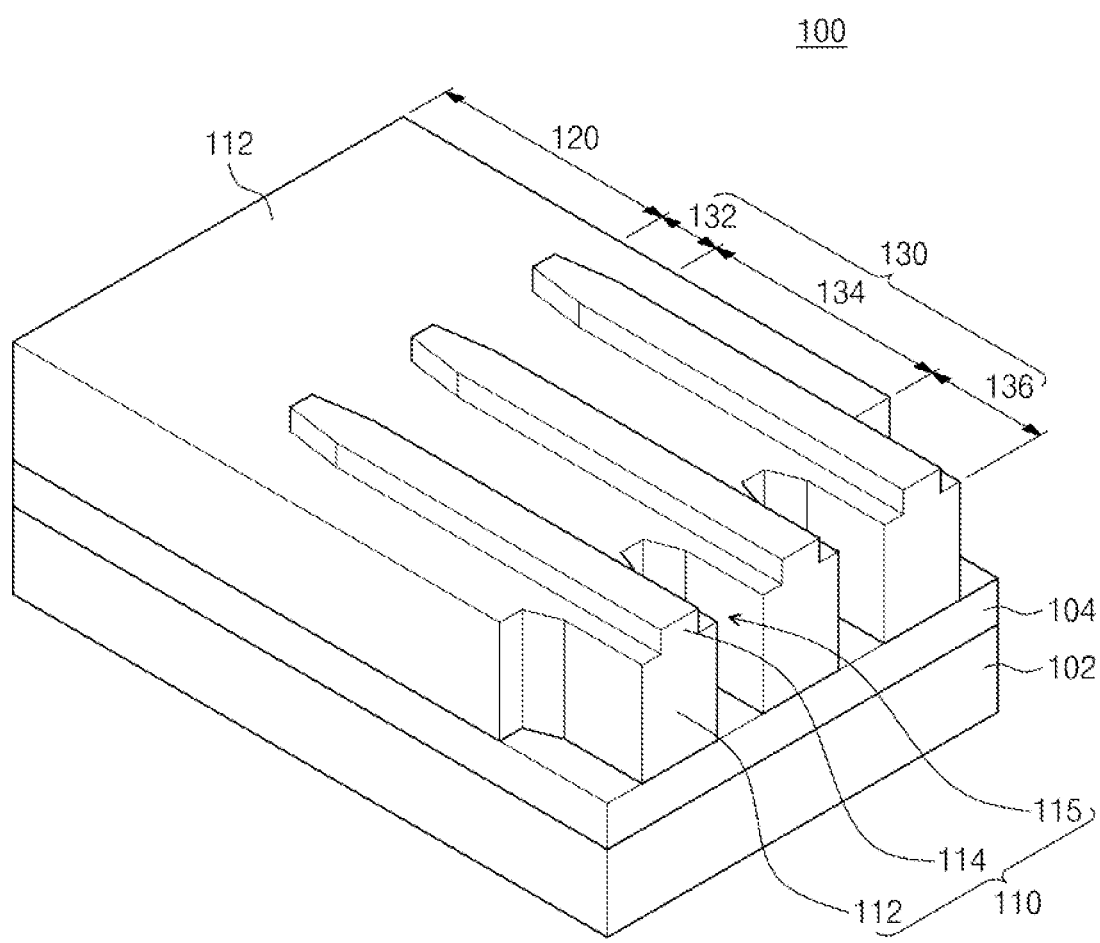
Figure 10:
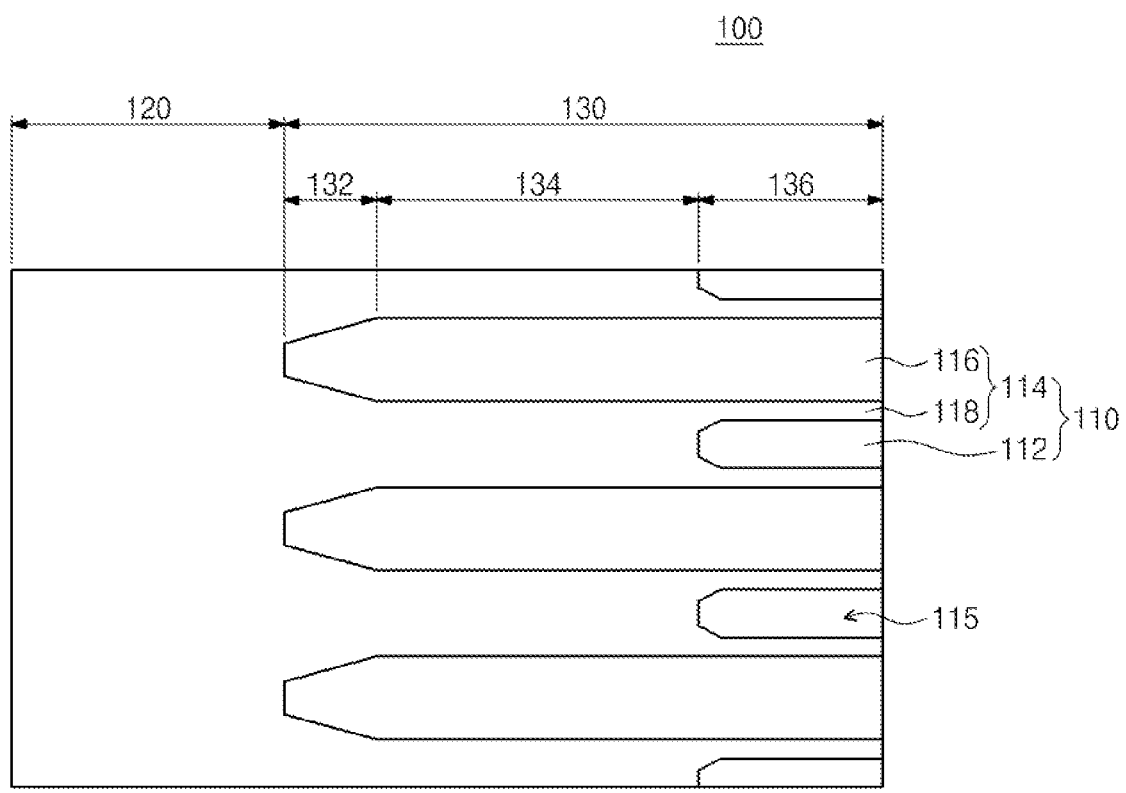
FIG. 10 is a plan view of FIG. 9A.

FIGS. 9A and 9B are perspective views further enlargedly illustrating the part B and the part B' of FIGS. 7A and 7B. FIG. 10 is a plan view of FIG. 9A.

Referring to FIGS. 4, 9A and 10, the coupler core 110 may include a coupler slab waveguide region 120 and a coupler ridge waveguide region 130.

The coupler core 110 of the coupler slab waveguide region 120 may include a coupler slab 112. For example, the coupler slab 112 may include single crystalline silicon. The coupler slab waveguide region 120 may be a slab waveguide.

The coupler core 110 of the coupler ridge waveguide region 130 may include the coupler slab 112 and the coupler ribs 114 on the coupler slab 112. The coupler ribs 114 may be disposed on one side of the coupler slab 112. The coupler ribs 114 may extend in one direction. The coupler ribs 114 may include single crystalline silicon. For example, the coupler ribs 114 may be ridge waveguides protruding from the coupler slab 112.

The coupler ribs 114 may include upper coupler ribs 116 and lower coupler ribs 118. The upper coupler ribs 116 may be provided on one side of the coupler slap 112. The upper coupler ribs 116 may extend in one direction. When a thickness of the coupler slab 112 is approximately 400 to approximately 450 nm, the upper ribs 116 may have a thickness of approximately 50 nm. When the thickness of the coupler slab 112 is approximately 220 nm, the upper ribs 116 may have a thickness of approximately 20 nm. The upper coupler ribs 116 may be inverse-tapered.

The lower coupler ribs 118 may be disposed between the upper coupler ribs 116 and the coupler slab 112. The lower coupler ribs 118 may be defined by the trench 115. The trench 115 may be provided on the coupler slab 112 adjacent to the upper coupler ribs 116. When the thickness of the coupler slab 112 is approximately 400 to approximately 450 nm, the trench 115 may have a depth of approximately 200 to approximately 250 nm. The trench 115 may have a line width of approximately 0.35 am or less. When the thickness of the coupler slab 112 is approximately 220 nm, the trench 115 may have a depth of approximately 70 nm. The trench 115 may have the line width of approximately 0.35 μm or less. The lower coupler ribs 118 may be shorter than the upper coupler ribs 116. The line width of the lower coupler ribs 118 may be wider than that of the upper coupler ribs 116.

The coupler slab 112 may have the same height at the coupler slab waveguide region 120 and the coupler ridge waveguide region 130. The coupler slab 112 may have at least one step provided by the trench 115. A side wall of the trench 115 may correspond to side walls of the upper coupler ribs 116 and the step of the coupler slab 112. The coupler slab 112 may become thicker at the coupler slab waveguide region 120 than at the coupler ridge waveguide region 130.

The coupler ridge waveguide region 130 may include a tapering region 132, a straight region 134 and a self-focusing region 136.

The tapering region 132 may correspond to tapered portions of the upper coupler ribs 116. The line width of each upper coupler ribs 116 in the tapering region 132 may be increased in a direction of the trench 115. The upper coupler 116 is inverse-tapered. When the thickness of the coupler slab 112 is approximately 220 nm or approximately 450 nm, and the thickness of the upper coupler ribs is approximately 20 nm or approximately 50 nm, the tapering region 132 may have a length of approximately 2 μm or more. The coupler ribs 114 in the tapering region 132 may have an interval of approximately 1 to approximately 2.5 μm.

The straight region 134 may be disposed between the tapering region 132 and the self-focusing region 136. The coupler core 110 of the straight region 134 may include the upper coupler ribs 116, and the coupler slab 112 under and around the upper coupler ribs 116. When the thickness of the coupler slab 112 is approximately 220 nm or approximately 450 nm, and the thickness of the upper coupler ribs is approximately 20 nm or approximately 50 nm, the straight region 134 may have a length of approximately 7 to approximately 15 μm. The coupler slab 112 may have the same height at all of the tapering region 132, the straight region 134 and the coupler slab waveguide region 120.

The self-focusing region 136 may be a region in which the trench 115 is provided. The coupler slab 112 may be lower at the self-focusing region 136 than at the tapering region 132 and the straight region 134. The lower coupler ribs 118 in the self-focusing region 136 may have the same height as that of the coupler slab 112 in the coupler slab waveguide region 120, the tapering region 132 and the straight region 134.

The coupler core 110 of the self-focusing region 136 may include the coupler ribs 114 between the trenches 115, and the coupler slab 112 under the coupler ribs 114 and at a bottom of the trench 115. The coupler ribs 114 in the self-focusing region 136 may include the upper coupler ribs 116 and the lower coupler ribs 118 under the upper coupler ribs 116.

The coupler slab 112 of the self-focusing region 136 may be connected to the arrayed slabs 312. The lower coupler ribs 118 may be connected to the arrayed slabs 312. However, the upper coupler ribs 116 may be connected to the arrayed ribs 314. The present invention is not limited thereto and also may be variously modified. The arrayed slabs 312 and the arrayed ribs 314 of the present invention will be described again in FIG. 13.

Referring to FIG. 9B, the coupler slab 112 at the bottom of the trench 115 of the self-focusing region 136 may be removed. The trench 115 may taper the coupler ribs 114. The trench 115 may induce self-focusing of the optical signal.

Figure 11:
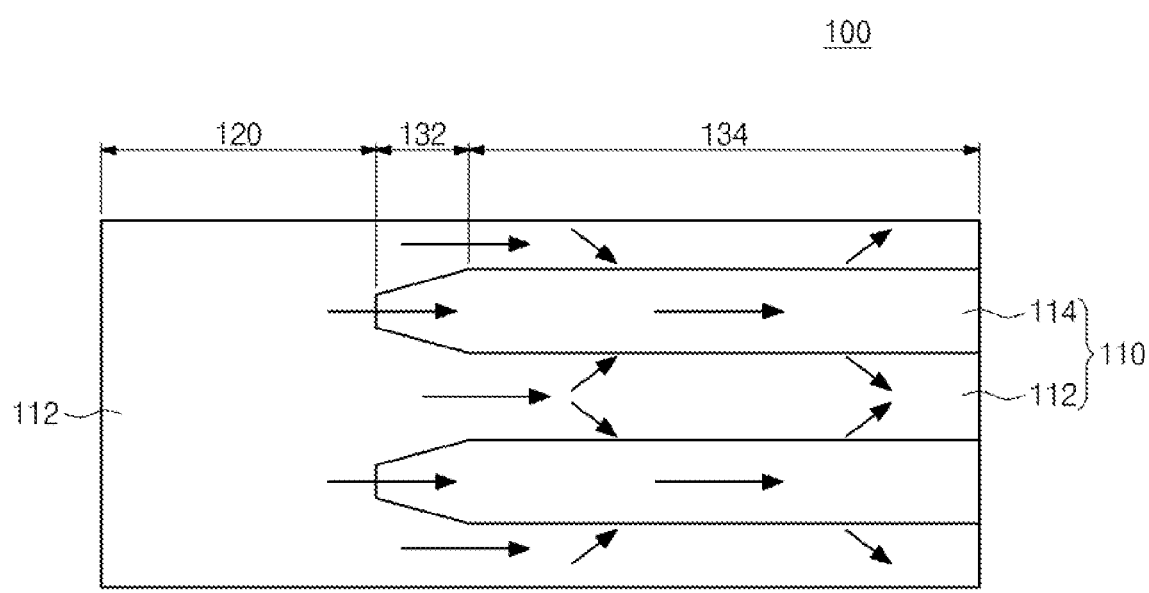
FIG. 11 is a view illustrating a simulation result of a light path in a general input star coupler.
Figure 12:
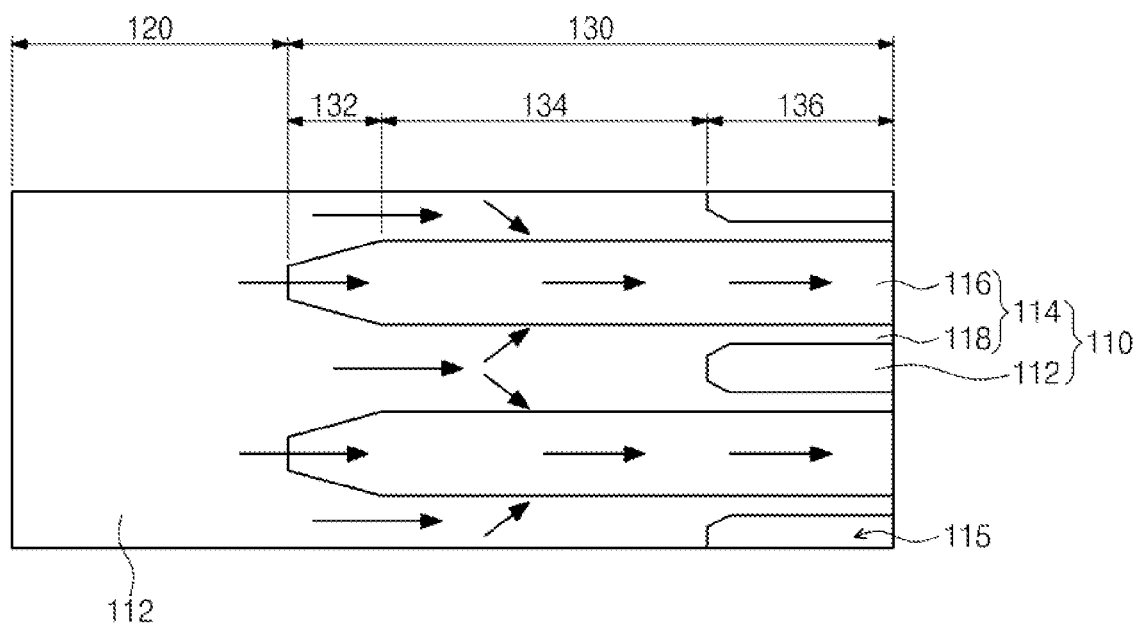
FIG. 12 is a view illustrating a simulation result of a light path in the input star coupler of the present invention.

FIG. 11 is a view illustrating a simulation result of a light path in a general input star coupler. FIG. 12 is a view illustrating a simulation result of a light path in the input star coupler 100 of the present invention.

Referring to FIGS. 4 and 8A to 12, in the general input star coupler 100 having the thin coupler rib 116, the optical signal may be spread at the straight region 134 of the coupler ridge waveguide region 130. An arrow indicates a proceeding direction of the optical signal. The optical signal may be focused on the coupler ribs 114 in the tapering region 132. However, most of the optical signals may exist outside the coupler ribs 114. The optical signal outside the coupler ribs 114 may not be transferred to the arrayed-waveguides 310 but may be lost. Therefore, in the general input star coupler 100 having the thin coupler rib 116, optical coupling efficiency of the optical signal may be deteriorated.

In the input star coupler 100 of the present invention, the optical signal may not be spread at the self-focusing region 136 but may proceed straight, and also optical coupling may occur in a single mode. The optical signal outside the coupler ribs 114 of the tapering region 132 and the straight region 134 may be focused at the self-focusing region 136 by the trench 115 and then may enable the optical coupling in the single mode. The optical signal may be given the straightness. Therefore, the input star coupler 100 according to the embodiment of the inventive concept may have the improved optical coupling efficiency.

Figure 13A:
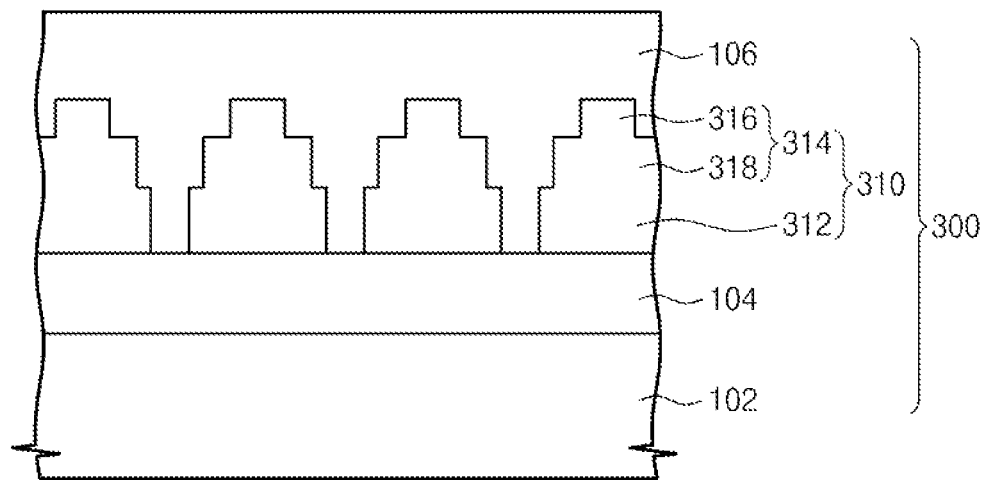
FIGS. 13A and 13B are cross-sectional views illustrating the arrayed-waveguides of the present invention.
Figure 13B:
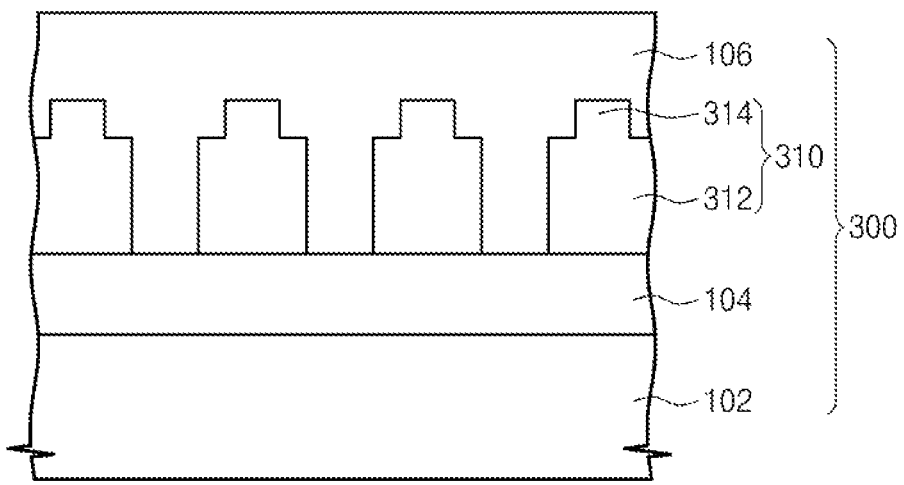

FIGS. 13A and 13B are cross-sectional views illustrating the arrayed-waveguides 310 of the present invention.

Referring to FIGS. 9A and 13A, the arrayed ribs 314 of the present invention may include upper arrayed ribs 316 and lower arrayed ribs 318.

The lower arrayed ribs 318 may be disposed on the arrayed slabs 312. The arrayed slabs 312 may be wider than the lower arrayed ribs 318. The upper arrayed ribs 316 may be disposed on the lower arrayed ribs 318, and the lower arrayed ribs 318 may be wider than the upper arrayed ribs 316.

The arrayed slabs 312 may be connected to the coupler slab 112 of the self-focusing region 136. The arrayed slabs 312 may have the same height as that of the coupler slab 112 at the bottom of the trench 115. This is because the arrayed slabs 312 may be defined when the trench 115 of the input star coupler 100 is defined. Therefore, the arrayed slabs 312 may be separated after defining of the trench 115.

The lower arrayed ribs 318 may be connected to the lower coupler ribs 118. The lower arrayed ribs 318 and the lower coupler ribs 118 may be defined at the same time when the trench 115 is defined. The upper arrayed ribs 316 may be connected to the upper coupler ribs 116. The upper arrayed ribs 316 and the upper coupler ribs 116 may be defined at the same time.

Referring to FIGS. 9B and 13B, the arrayed-waveguides 310 may include the arrayed ribs 314 and the arrayed slabs 312. The arrayed ribs 314 and the arrayed slabs 312 may be respectively connected to the coupler ribs 114 and the coupler slab 112.

Figure 14:
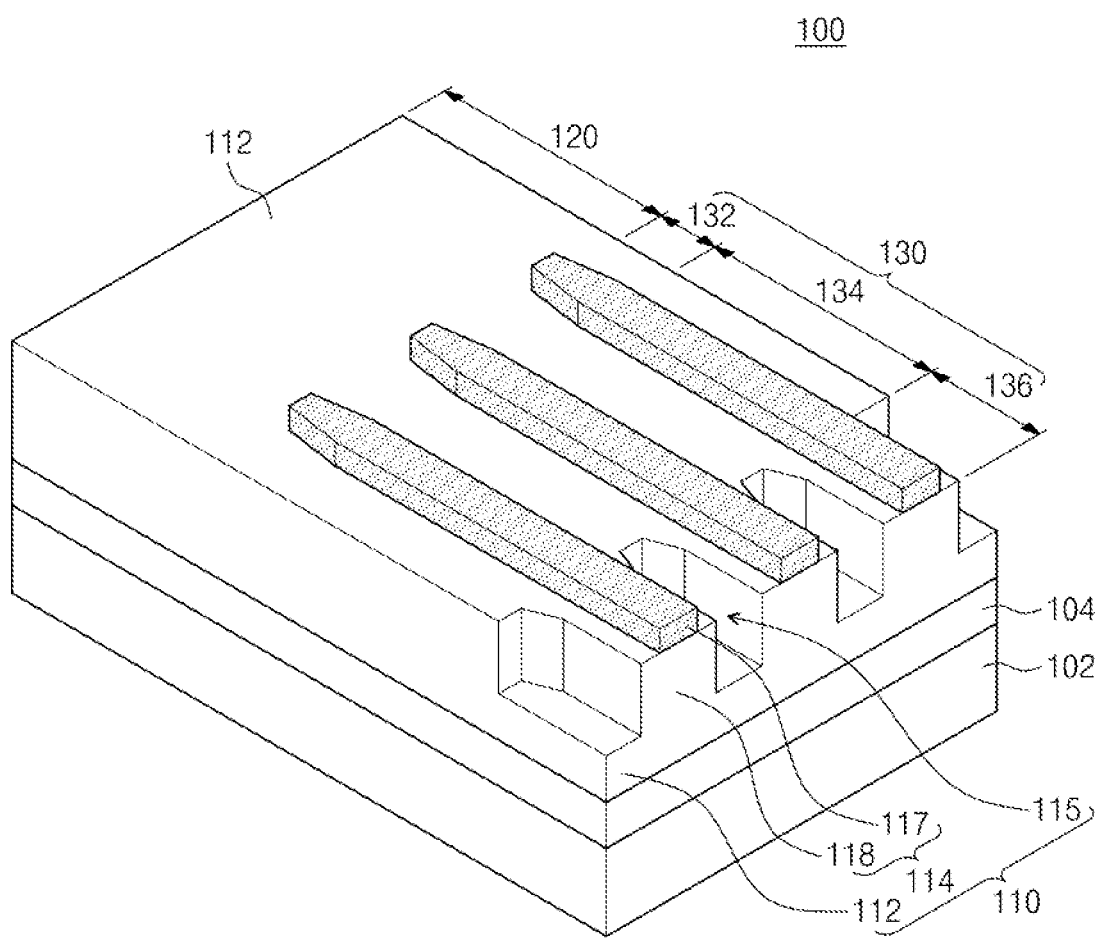
FIG. 14 is a perspective view illustrating an input star coupler according to a first applied example of the present invention.

FIG. 14 is a perspective view illustrating an input star coupler 100 according to a first applied example of the present invention.

Referring to FIG. 14, the input star coupler 100 according to the first applied example of the present invention may include coupler ribs 114 including high upper refractive coupler ribs 117 and lower coupler ribs 118.

The high refractive upper coupler ribs 117 having a refractive index higher than that of the clad and smaller than that of the lower coupler rib, and the lower coupler ribs 118 may have a hetero-junction structure. The upper coupler ribs 117 may have a refractive index smaller than those of the lower coupler ribs 118 and the coupler slab 112 and higher than that of the clad. This is because the optical signal may proceed in a direction having a high effective refractive index. The upper coupler ribs 117 may include a silicon nitride ($Si_3N_4$) film or a silicon oxynitride (SiON) film which having a lower refractive index than that of the crystalline silicon.

The lower coupler ribs 118 may be formed of the same material as that of the coupler slab 112. The lower coupler ribs 118 and the coupler slab 112 may include crystalline silicon.

In the first applied example, the upper coupler ribs 116 in the first embodiment is substituted with the upper coupler ribs 17 formed of a material which is different from that of the lower coupler ribs 118 and has a refractive index larger than that of the clad and smaller than that of the lower coupler rib.

Figure 15:
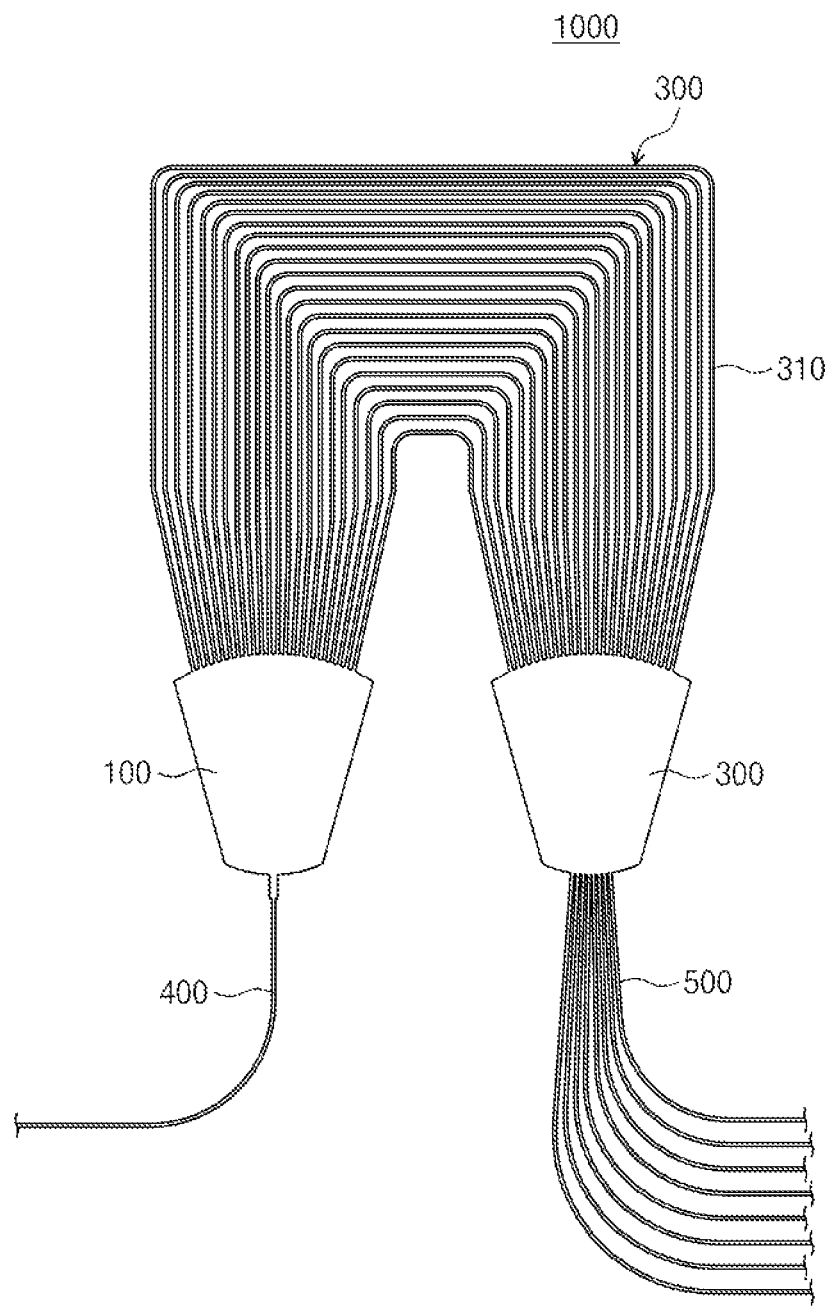
FIG. 15 is a plan view illustrating an arrayed-waveguide grating according to a second embodiment of the inventive concept.
Figure 16:
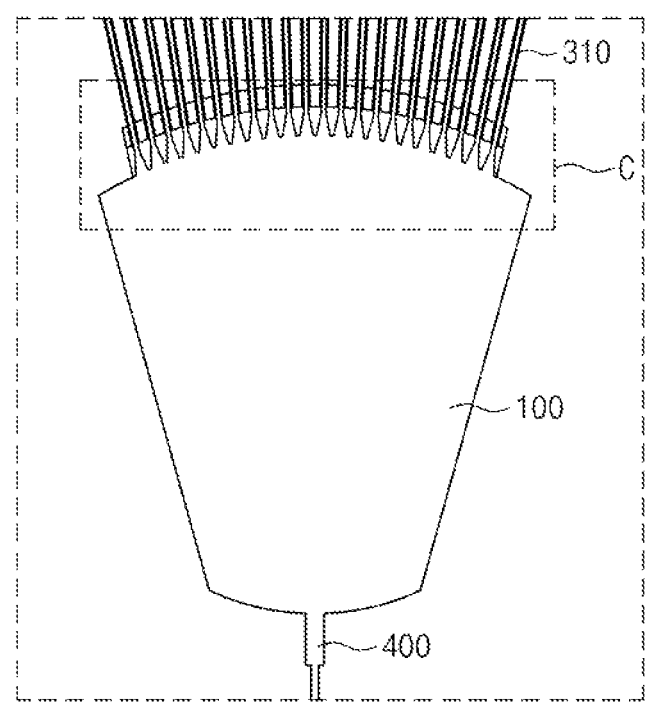
FIG. 16 is a plan view illustrating an input star coupler of FIG. 15.
Figure 17A:
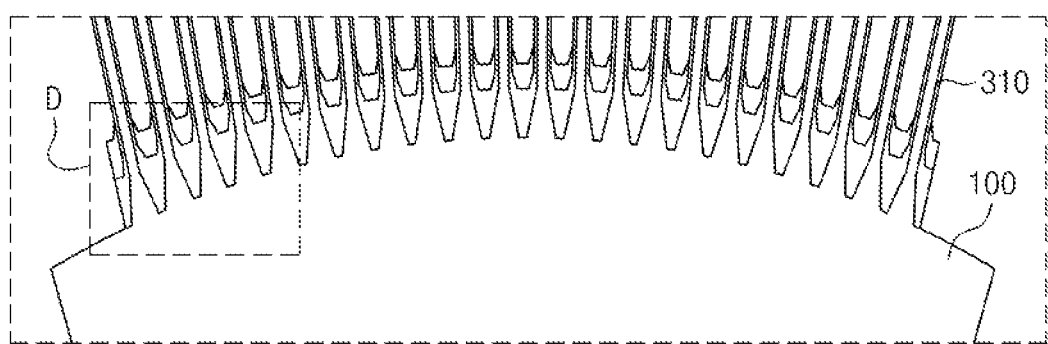
FIGS. 17A and 17B are plan views enlargedly illustrating a part C of FIG. 16.
Figure 17B:
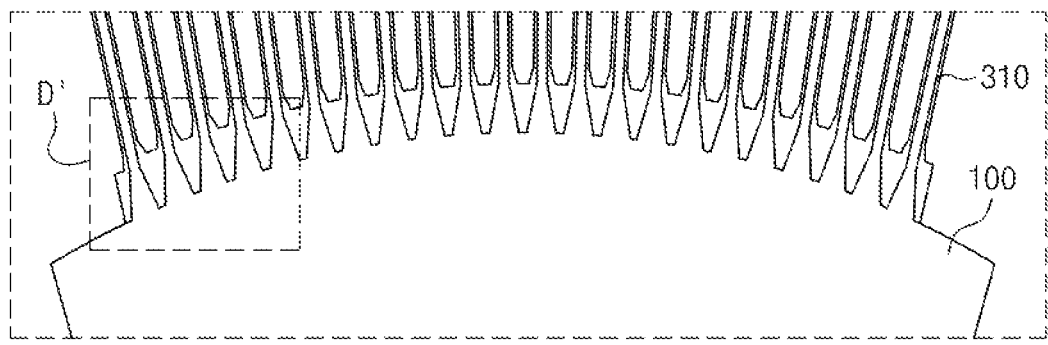
Figure 18A:
FIGS. 18A and 18B are plan views enlargedly illustrating a part D and a part D' of FIGS. 17A and 17B.
Figure 18B:
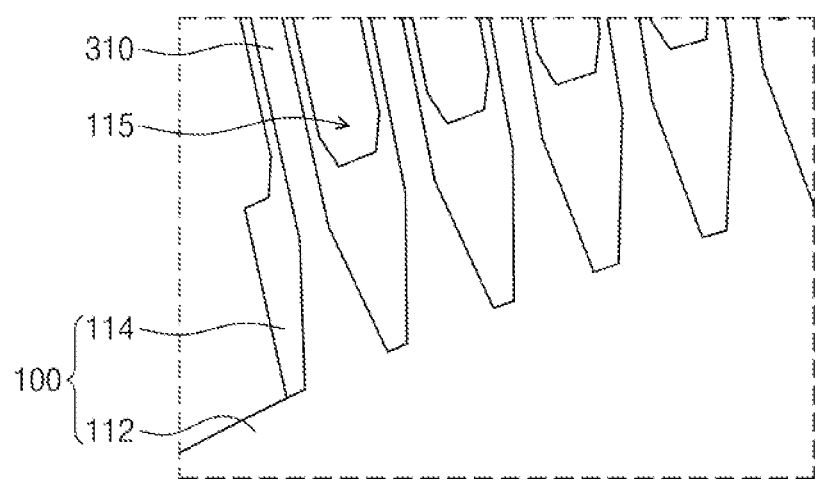

FIG. 15 is a plan view illustrating an arrayed-waveguide grating 1000 according to a second embodiment of the inventive concept. FIG. 16 is a plan view illustrating an input star coupler 100 of FIG. 15. FIGS. 17A and 17B are plan views enlargedly illustrating a part C of FIG. 16. FIGS. 18A and 18B are plan views enlargedly illustrating a part D and a part D' of FIGS. 17A and 17B.

Referring to FIGS. 15 to 18B, the arrayed-waveguide grating 1000 of second embodiment of the inventive concept may include an input star coupler 100 including a coupler slab 112 and forward-tapered coupler ribs 114. The coupler ribs 114 has a line width which is gradually reduced as the coupler ribs 114 become far from the coupler slabs 112. The coupler slabs 112 may include trenches 115 between the coupler ribs 114. In the second embodiment, the coupler ribs 114 of the first embodiment are forwardly tapered.

Figure 19A:
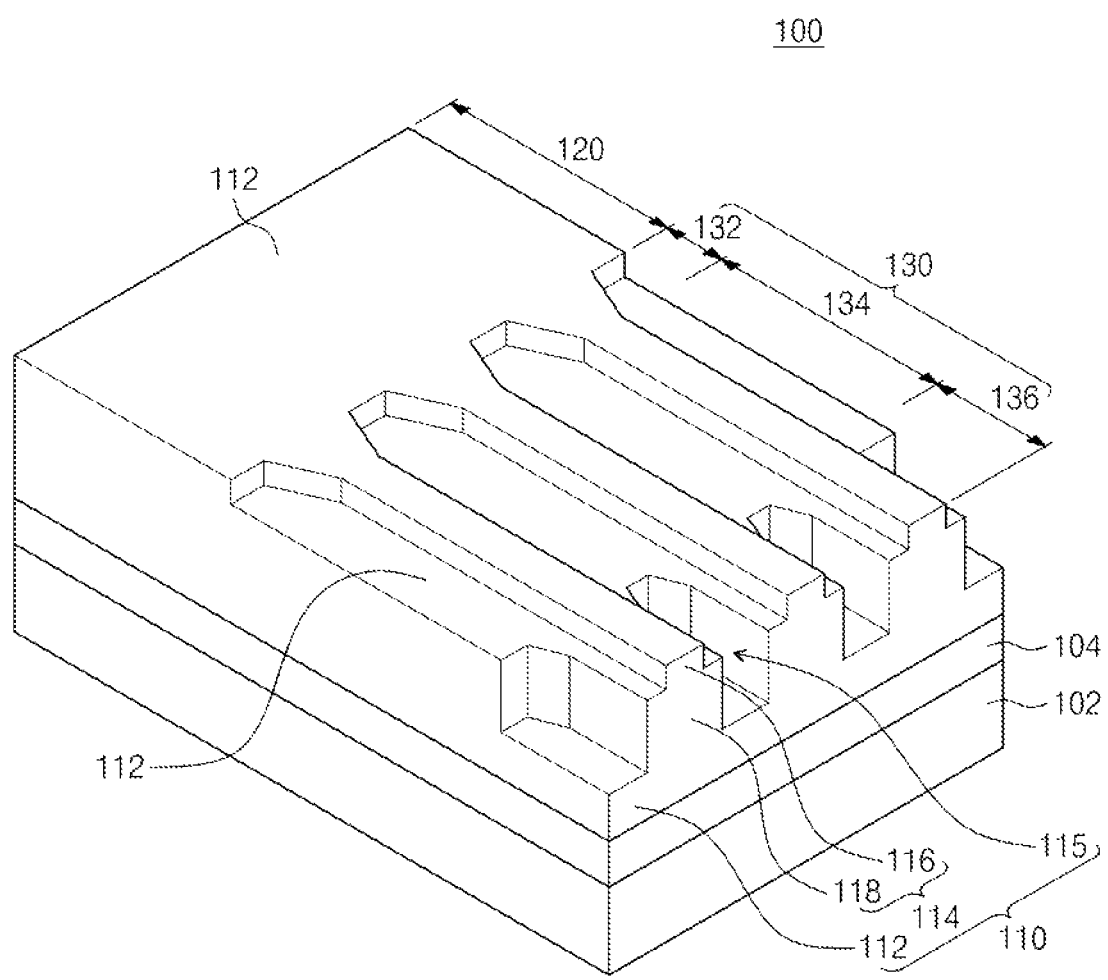
FIGS. 19A and 19B are perspective views enlargedly illustrating the part D and the part D' of FIGS. 17A and 17B.
Figure 19B:
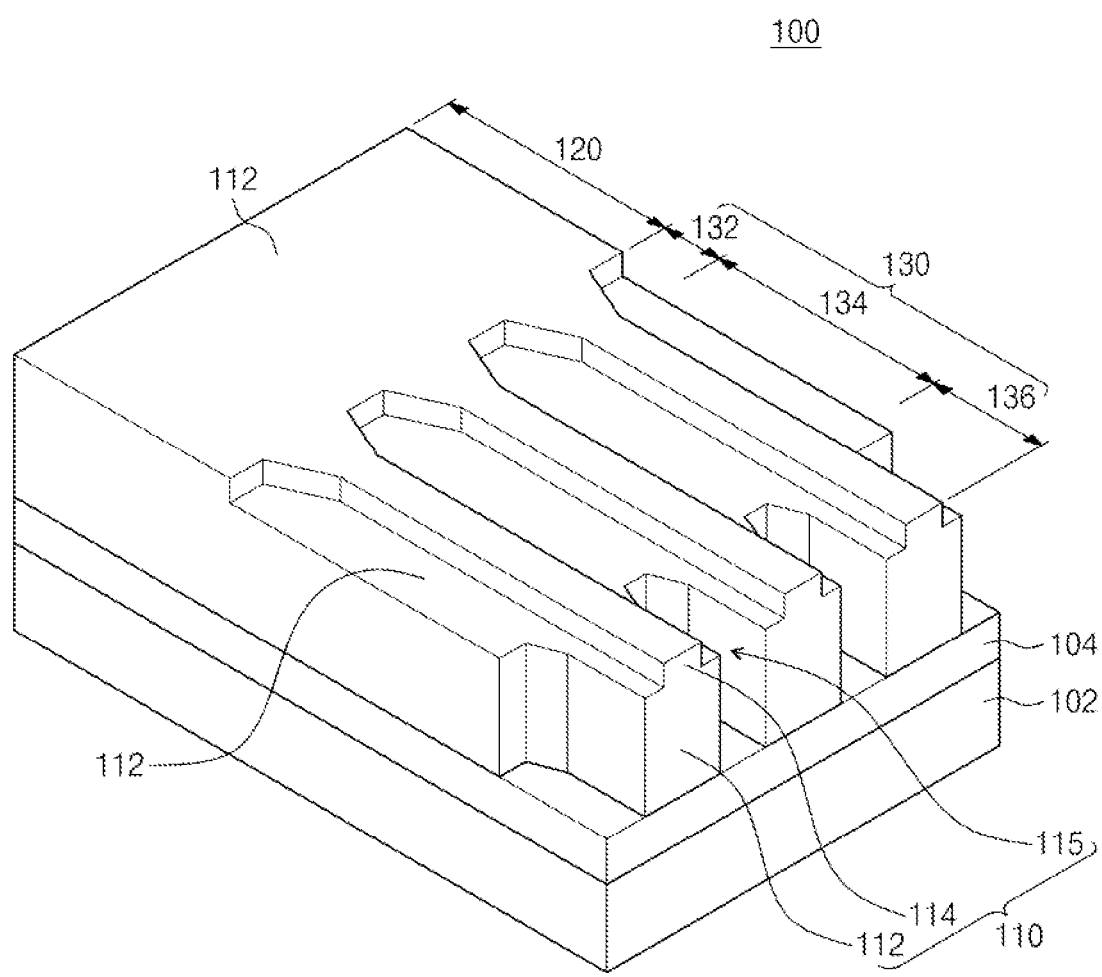
Figure 20:
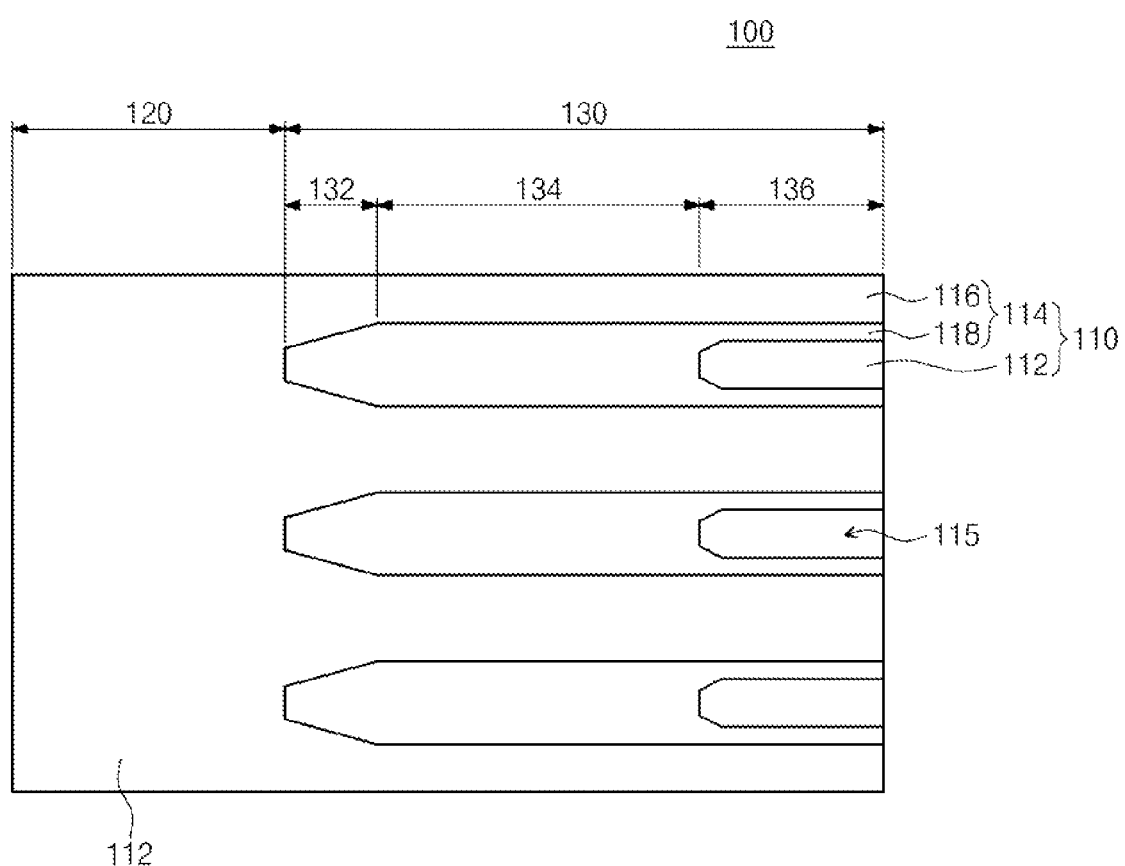
FIG. 20 is a plan view of FIG. 19.

FIGS. 19A and 19B are perspective views enlargedly illustrating the part D and the part D' of FIGS. 17A and 17B. FIG. 20 is a plan view of FIG. 19.

Referring to FIGS. 19A and 20, the coupler slab 112 in the coupler slab waveguide region 120 and the coupler ribs 114 in the coupler ridge waveguide region 130 may have the same height.

The coupler slab 112 may have different heights at the coupler slab waveguide region 120 and the coupler ridge waveguide region 130. The coupler slab 112 may be higher at the coupler slab waveguide region 120 than at the coupler ridge waveguide region 130. The coupler ribs 114 may be disposed on the coupler slab 112 in the coupler ridge waveguide region 130. The coupler ribs 114 may be ridge waveguides etched from the coupler slab 112. The coupler slab 112 of the coupler ridge waveguide region 130 may have a thickness of approximately 0.22 µm to approximately 0.45 µm.

The coupler slab 112 may have the same level at the tapering region 132 and the straight region 134. The coupler slab 112 may have different heights at the self-focusing region 136 and the tapering region 132, or at the self-focusing region 136 and the straight region 134. The coupler slab 112 may be higher at the tapering region 132 and the straight region 134 than at the self-focusing region 136. The coupler slab 112 of the self-focusing region 136 may be defined as the bottom of the trench 115.

The coupler ribs 114 may include upper coupler ribs 116 and lower coupler ribs 118. The upper coupler ribs 116 may have a thickness of approximately 0.05 µm to approximately 0.02 µm.

Referring to FIG. 19B, the coupler slab 112 at the bottom of the trench 115 of the self-focusing region 136 may be removed. The trench 115 may taper the coupler ribs 114. The trench 115 may induce self-focusing of the optical signal.

Figure 21:
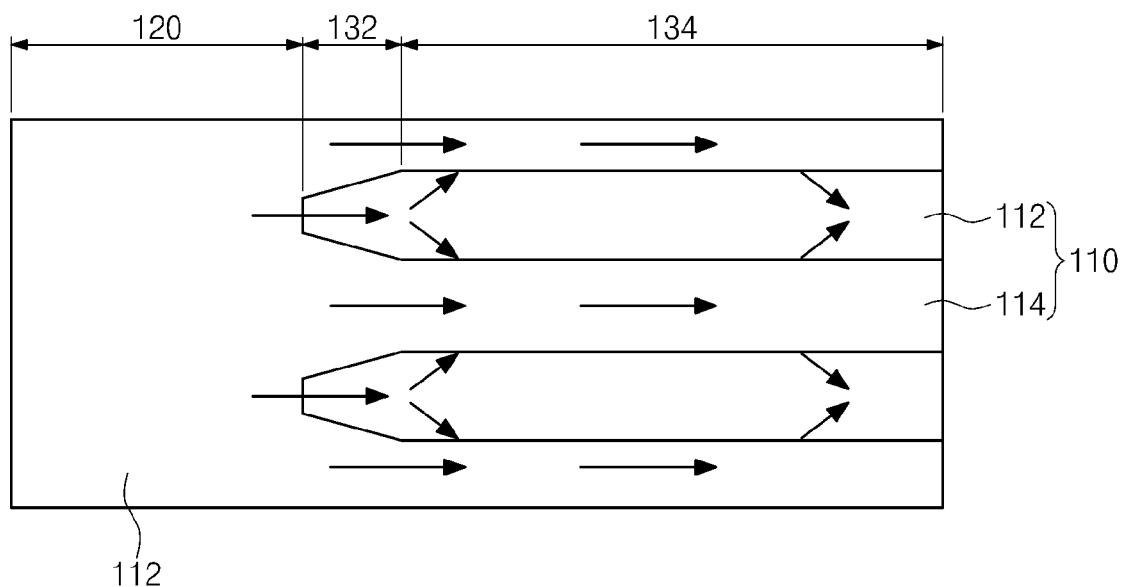
FIG. 21 is a view illustrating a simulation result of a light path in a general input star coupler.
Figure 22:
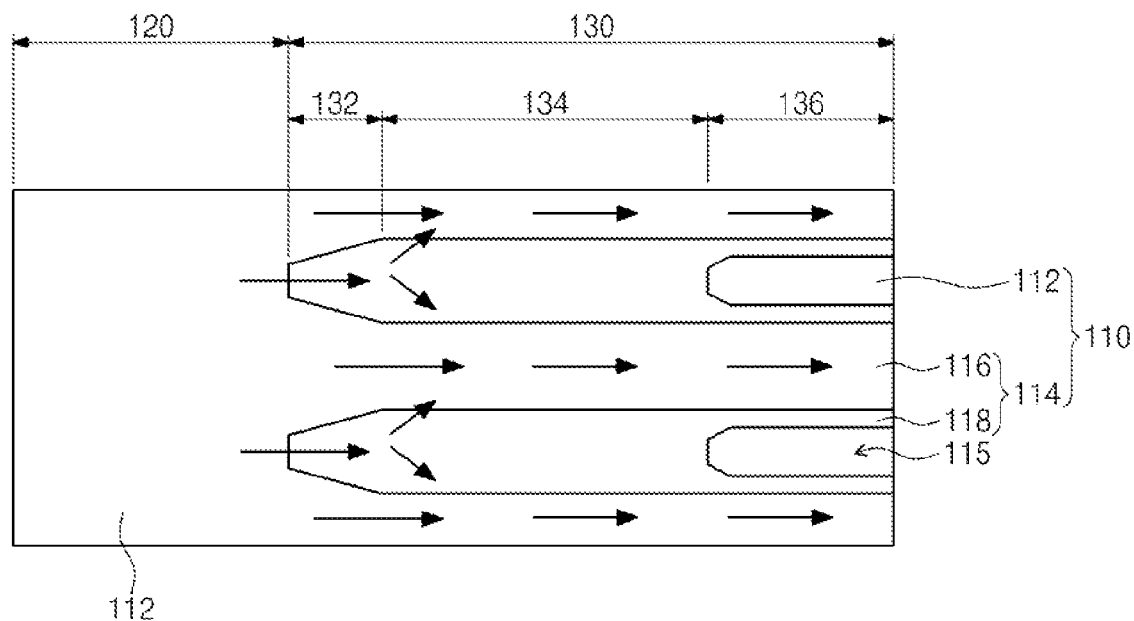
FIG. 22 is a view illustrating a simulation result of a light path in the input star coupler of the present invention.

FIG. 21 is a view illustrating a simulation result of a light path in a general input star coupler. FIG. 22 is a view illustrating a simulation result of a light path in the input star coupler 100 of the present invention.

Referring to FIGS. 4, 20 and 21, in the (general) input star coupler 100 having the thin coupler rib 116, the optical signal may be spread at the straight region 134. The optical signal may be focused on the forward-tapered coupler ribs 114 in the tapering region 132. The optical signal outside the forward-tapered coupler ribs 114 may not be transferred to the arrayed-waveguides 310 but may be lost.

The input star coupler 100 of the present invention may prevent or minimize an optical loss of the optical signal. The trench 15 in the self-focusing region 136 may focus the optical signal on the coupler ribs 14 and also may allow the optical coupling in the single mode to be occurred to the arrayed waveguides 310.

Figure 23:
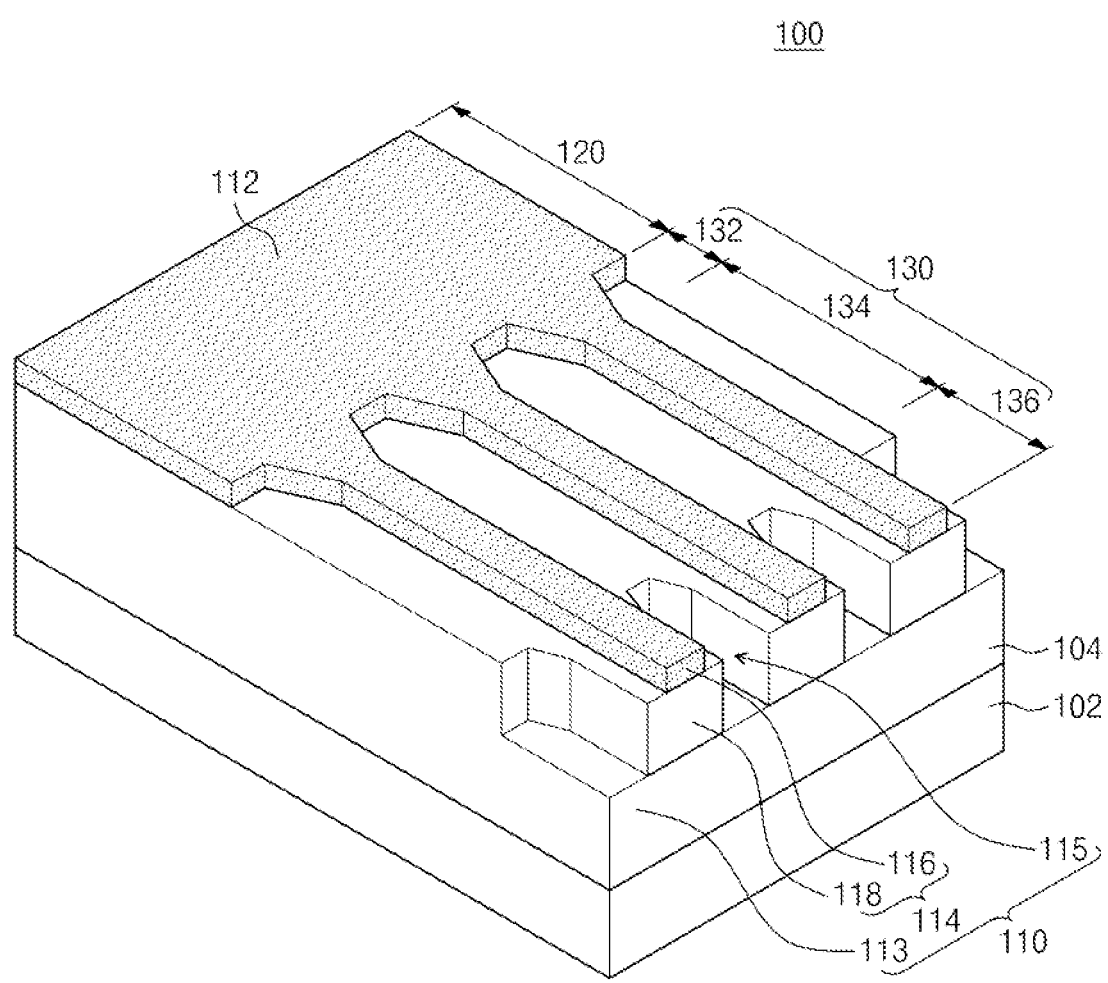
FIG. 23 is a perspective view illustrating an input star coupler according to a second applied example of the present invention.

FIG. 23 is a perspective view illustrating an input star coupler 100 according to a second applied example of the present invention.

Referring to FIG. 23, the input star coupler 100 according to the second applied example of the present invention may include coupler slabs 112 including an upper coupler slab 111 and a lower coupler slab 113.

The upper slab 111 may be disposed at the coupler slab waveguide region 120. Upper coupler ribs 116 may be disposed at the coupler ridge waveguide region 130. The upper coupler slab 111 may be connected to the upper coupler ribs 116. The upper coupler slab 111 and the upper coupler ribs 116 may be formed of the same material. For example, the upper coupler slab 111 and the upper coupler ribs 116 may include the silicon nitride film or a silicon oxynitride film.

The lower coupler slab 113 may be disposed in the coupler slab waveguide region 120 and the coupler ridge waveguide region 130. The lower coupler slab 113 may be disposed under a part of the upper coupler ribs 116 and the upper coupler slab 111. The lower coupler slab 113 and the lower coupler ribs 118 may include the crystalline silicon.

The coupler ribs 114 may include the upper coupler ribs 116 and the lower coupler ribs 118. The lower coupler ribs 118 may be disposed between the upper coupler ribs 116 and the lower coupler slab 113. The lower coupler ribs 118 may be defined by the trenches 115 on the lower coupler slab 113. A step of the lower coupler slab 113 may correspond to side walls of the trenches 115.

In the second applied example, the coupler slab 112 in the second embodiment is divided into the upper coupler slab 111 and the lower coupler slab 113.

As described above, the optical coupler according to the embodiments of the inventive concept may include the core including the coupler slab waveguide region and the coupler ridge waveguide region. The core of the coupler ridge waveguide region may include the coupler slab, the upper coupler ribs on the coupler slab and the lower coupler ribs between the upper coupler ribs and the coupler slab. The lower coupler ribs may be defined by the trenches on the coupler slab. Since the trenches focus the optical signal on the lower coupler ribs and the upper coupler ribs and also enable the optical coupling in the single mode, the scattering of the optical signal may be prevented.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A coupler comprising:
   a lower clad layer disposed in a slab wave guide region, a tapering region, a straight region, and a self-focusing region that are arranged in the order of the slab waveguide region, the tapering region, the straight region, and the self-focusing region;
   a core disposed on the lower clad layer and comprising a slab and a plurality of ribs; and
   an upper clad disposed on the core,
   wherein the slab includes:
      a first portion disposed in the slab waveguide region; and
      a second portion disposed adjacent to the first portion and in the tapering region and the straight region,
   wherein the ribs include:
      lower ribs defined by trenches formed in the self-focusing region; and
      upper ribs disposed on the lower ribs, respectively, and wherein the trenches in the self-focusing region are configured to focus an optical signal provided from the slab waveguide region to reduce scattering of the optical signal.

2. The coupler of claim 1, wherein the slab further includes a third portion disposed adjacent to the second portion and in the self-focusing region, and
wherein the lower ribs are disposed directly on the third portion of the slab in the self-focusing region.

3. The coupler of claim 1, wherein a width of each of the lower ribs is wider than that of a corresponding one of the upper ribs, the width of each of the lower ribs corresponding to a direction perpendicular to a longitudinal direction of each of the lower ribs.

4. The coupler of claim 1, wherein a length of each of the lower ribs is shorter than that of a corresponding one of the upper ribs, the length of each of the lower ribs corresponding to a longitudinal direction of each of the lower ribs.

5. The coupler of claim 1, wherein the upper ribs each have a width that gradually increases in the tapering region from the slab waveguide region toward the straight region, the width of each of the upper ribs corresponding to a direction perpendicular to a longitudinal direction of each of the upper ribs.

6. The coupler of claim 1, wherein a top surface of the first portion of the slab and a top surface of the second portion of the slab are coplanar with top surfaces of the lower ribs.

7. The coupler of claim 1, wherein the upper ribs have a lower refractive index than that of the lower ribs.

8. The coupler of claim 1, wherein the lower ribs comprise crystalline silicon, and the upper ribs comprise a silicon nitride film or a silicon oxynitride film.

9. The coupler of claim 1, wherein the upper ribs each have a width that gradually decreases in the tapering region from the slab waveguide region toward the straight region, the width of each of the upper ribs corresponding to a direction perpendicular to a longitudinal direction of each of the upper ribs.

10. The coupler of claim 1, wherein a top surface of the first portion of the slab is separated by a first distance from a top surface of the lower clad, and a top surface of the second portion of the slab is separated by a second distance from the top surface of the lower clad, and the first distance is different from the second distance.

11. The coupler of claim 1, wherein a top surface of the first portion of the slab in the slab waveguide region is coplanar with top surfaces of the upper ribs in the tapering region, the straight region, and the self-focusing region.

12. The coupler of claim 1, wherein the first and second portions of the slab are a lower slab, and wherein the slab further includes:
an upper slab disposed on the first portion of the slab in the slab waveguide region, the upper slab having a refractive index higher than that of the lower slab.

13. The coupler of claim 12, wherein the lower slab and the lower ribs comprise crystalline silicon, and the upper slab and the upper ribs comprise a silicon nitride film or a silicon oxynitride film.

14. An arrayed-waveguide grating structure comprising;
an input star coupler;
an output star coupler coupled to the input star coupler; and
an arrayed waveguide structure including a plurality of arrayed waveguides configured to couple the output star coupler and the input star coupler,
wherein the output star coupler comprises:
a lower clad layer disposed in a slab wave guide region, a tapering region, a straight region, and a self-focusing region that are arranged in the order of the slab waveguide region, the tapering region, the straight region, and the self-focusing region;
a core disposed on the lower clad layer and comprising a slab and a plurality of ribs; and
an upper clad disposed on the core,
wherein the slab includes:
a first portion disposed in the slab waveguide region; and
a second portion disposed adjacent to the first portion and in the tapering region and the straight region,
wherein the ribs include:
lower ribs defined by trenches formed in the self-focusing region; and
upper ribs disposed on the lower ribs, respectively, and
wherein the trenches in the self-focusing region are configured to focus an optical signal provided from the slab waveguide region to reduce scattering of the optical signal.

15. The arrayed-waveguide grating structure of claim 14, wherein the arrayed waveguides comprise arrayed slabs and arrayed ridge waveguides disposed on the arrayed slabs.

16. The arrayed-waveguide grating structure of claim 15, wherein the arrayed ridge waveguide comprises:
lower arrayed ridge waveguides disposed on the arrayed slabs and each connected to a corresponding one of the lower ribs; and
upper arrayed ridge waveguides disposed on the lower arrayed ridge waveguides and each connected to a corresponding one of the upper ribs.

17. The coupler of claim 10, wherein the first distance of the first portion of the slab from is greater than the second distance of the second portion of the slab.

18. The arrayed-waveguide grating structure of claim 14, wherein the slab further includes a third portion disposed adjacent to the second portion and in the self-focusing region, and
wherein the lower ribs are disposed directly on the third portion of the slab in the self-focusing region.

19. The coupler of claim 1, wherein a thickness of the slab is approximately 220 nm or approximately 450 nm, a thickness of the upper ribs is approximately 20 nm or approximately 50 nm, and a length of the straight region is approximately 7 μm to approximately 15 μm.

* * * * *